United States Patent [19]

Rochford et al.

[11] 4,223,640

[45] Sep. 23, 1980

[54] FUEL FIRING

[75] Inventors: Robert S. Rochford, Akron, Ohio; Robert S. Leckonby, Highland Mills, N.Y.; Ronald C. Lutwen, Akron, Ohio; Gerald A. Cymny, Mahwah, N.J.

[73] Assignee: The Babcock & Wilcox Company, New Orleans, La.

[21] Appl. No.: 971,965

[22] Filed: Dec. 21, 1978

[51] Int. Cl.³ .............................................. F22B 33/00
[52] U.S. Cl. ................................. 122/1 R; 110/254; 110/347; 122/1 A
[58] Field of Search .................. 122/1 R, 1 A, 1 C, 2, 122/7 R, DIG. 2, 412, DIG. 7, 439, 458; 110/254, 346, 347, 348, 234, 103, 308, 343, 106

[56] References Cited

U.S. PATENT DOCUMENTS

| 2,171,535 | 9/1939 | Berg et al. | 110/254 |
|---|---|---|---|
| 2,795,401 | 6/1957 | Cooper | 165/5 |
| 2,832,571 | 4/1958 | Baver | 165/103 |
| 3,117,538 | 1/1964 | Baver et al. | 110/347 |
| 3,148,665 | 9/1964 | Switzer, Jr. | 122/1 R |
| 3,213,831 | 10/1965 | Hochmuth | 122/1 R |

FOREIGN PATENT DOCUMENTS 953153 12/1949 France ................................... 122/1 R
826771 1/1960 United Kingdom .

Primary Examiner—Henry C. Yuen
Attorney, Agent, or Firm—Robert J. Edwards; Edward A. Steen; Stephen R. Doody

[57] ABSTRACT

An apparatus and method to permit the burning of high and varying moisture content fuels without requiring supplemental fuel (oil or gas) firing. The invention provides in-situ drying of the high and varying moisture content fuels by modulating the temperature of the combustion air entering the furnace (11) of the vapor generator (10). The variable flow paths taken by the air and flue gas are functions of the moisture content of the fuel being fired. The flue gas may be selectively bypassed around an economizer (20) for direct introduction into a first air heater (30). The gas is then passed through a precipitator (34) and a second air heater (40). Combustion air is passed through the second air heater (40) and may be then apportioned between the first air heater (30) and a by-pass (60) around the air heater (40) before introduction into the furnace (11).

10 Claims, 1 Drawing Figure

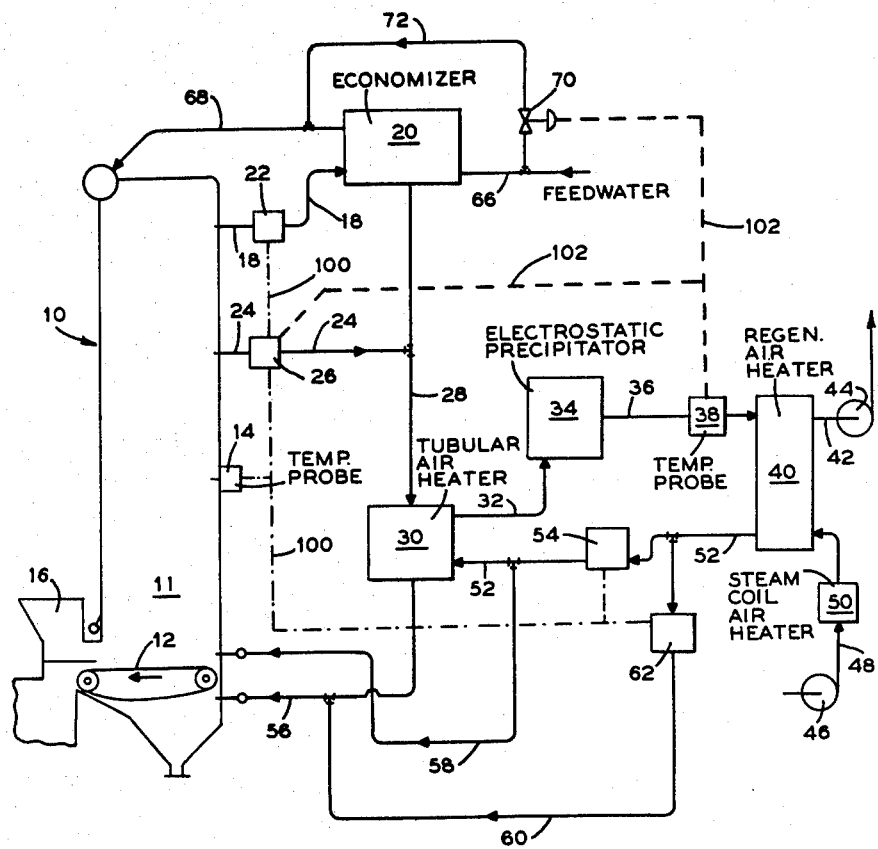

FUEL FIRING

TECHNICAL FIELD

This invention relates to vapor generators and more specifically to refuse fired vapor generators.

BACKGROUND ART

Spiraling energy costs and a heightened concern for the environment have prompted both the private and public sectors to seriously consider municipal refuse as a viable alternate energy source.

It has been estimated that the rate of domestic waste production averages about 5 pounds per person per day. The energy content of this potential fuel is between 4000–6000 BTU/lb. Since Americans presently throw away about 145 million tons of energy rich refuse a year, a potential $1.74 \times 10^{15}$ BTU's may be recovered annually. This is equivalent to the energy contained in $8.75 \times 10^7$ tons of coal or $3.11 \times 10^8$ barrels of oil.

Unfortunately, due to its heterogeneous and variable nature, refuse is not an ideal fuel with moisture content varying from 15% to over 55%. It has been established that if the moisture content of the refuse derived fuel (RDF) exceeds 30%, supplemental oil or gas firing is required to sustain furnace combustion efficiency. However, the use of supplemental fuel in an RDF fired vapor generator is, obviously, a self-defeating proposition.

SUMMARY OF THE INVENTION

The present invention is directed at an apparatus and a method which can successfully burn high and variable moisture laden RDF without resorting to supplemental fuel (oil, gas, etc.) firing to sustain combustion. It should be noted, however, that this design can be employed to burn other fuels of high and varying moisture content as well.

Accordingly, there is provided an arrangement to vary the temperature of the combustion air to provide the correct amount of in-situ drying of the RDF to: maintain ignition of the RDF; maintain the exit flue gas temperature of the associated heat exchange and gas clean-up apparatus above the temperature corresponding to the dew point of the flue gas so that cold end corrosion is kept to a minimum; and maintain control of outlet steam conditions of pressure, temperature and flow.

The flow path taken by the flue gas discharged from the furnace and the combustion air destined for the furnace are functions of the moisture content of the refuse. The gas-side arrangement provides for selectively apportioning the flue gas between an economizer and a by-pass flow path around the economizer and then directing all of the gas successively through a hot stage tubular air heater, a precipitator and a cold stage regenerative air heater. The corresponding air-side arrangement provides for directing all of the required combustion air through the cold stage regenerative air heater and then selectively apportioning the combustion air between the tubular air heater and a by-pass flow path around the tubular air heater. In addition, provision is made to selectively by-pass boiler feedwater around the economizer for direct introduction into the boiler.

The proper modulation of the combustion air temperature is determined by a gas temperature measuring probe extending into the furnace. The probe takes advantage of the known inverse relationship between fuel moisture content and furnace gas temperature. As the moisture content of the fuel increases, the furnace gas temperature will decrease proportionally (assuming that the rate of combustion air flow entering the furnace is held constant). The converse is true as well. This phenomenon occurs chiefly because as the entrained moisture content of the fuel increases, greater quantities of heat are necessary solely to vaporize the water. Therefore, instead of raising the temperature of the gases within the furnace, combustion heat is siphoned off by the vaporizing water thereby decreasing the furnace gas temperature of the vapor generator. In order to counteract this undesirable situation, the present invention provides the means for increasing the temperature of the preheated combustion air being delivered to the furnace. The introduction of higher temperature air will offset the loss in furnace gas temperature. Therefore, as the moisture content of the refuse increases, combustion air at a higher temperature is introduced into the combustion zone of the vapor generator furnace to maintain the temperature level required for stable fuel ignition.

It should be appreciated that even modest oscillations in furnace gas temperature, induced by the varying moisture levels of the refuse, are undesirable since they may lead to abnormal variations in the outlet steam pressure and the outlet steam flow. In addition, these oscillations may tend to damage the furnace. Depressed furnace temperatures, induced by refuse having high moisture levels, may cause incomplete combustion of the refuse, higher pollutant output, and undesirably lower steam flows from the boiler. Increased furnace temperatures, indicative of low moisture refuse, may cause the stoker grates to overheat and become damaged. Furthermore, undesirably greater steam outputs may be experienced. It is, therefore, imperative that the furnace gas temperature remain within the specified design temperature range of the vapor generator. The invention accomplishes this objective by regulating the temperature of the combustion air. Low moisture fuel will require a proportionately lower combustion air temperature whereas high moisture fuel will require a proportionately greater combustion air temperature.

Consequently, if the furnace temperature probe detects a threshold change in furnace gas temperature (which has been corrected for the requisite steam and air flows), various air and gas dampers will open and close (partially or fully depending on the situation) to expose greater or lesser quantities of combustion air to indirect heat exchange with higher or lower temperature gases to either raise or lower the temperature of the combustion air entering the furnace. At the same time, the exit flue gas temperature will be monitored by a gas temperature probe disposed between the precipitator and regenerative heat heater so as to prevent possible low temperature corrosion damage to these components.

BRIEF DESCRIPTION OF THE DRAWING

The drawing is a schematic embodying the invention.

BEST MODE FOR CARRYING OUT THE INVENTION

The preferred arrangement shown in the drawing provides a tubular air heater 30, an electrostatic precipitator 34 and then a regenerative air heater 40 in seriatim.

This particular arrangement was prompted by the problems posed by the use of refuse as fuel.

Flue gas generated from the combustion of refuse is inherently dirty. As a consequence, a regenerative air heater installed immediately downstream gas flow-wise of the economizer would quickly become fouled. If, on the other hand, an electrostatic precipitator were interposed in the gas flow path directly between the economizer and the regenerative air heater, there would be periods when the flue gas temperature would be excessively high, causing both a reduction in precipitator efficiency and the formation of high temperature corrosion within the precipitator.

In order to surmount the aforementioned problems, the tubular air heater 30 is placed upstream gas flow-wise the precipitator 34 and the regenerative air heater 40. Since the tubular air heater 30 is capable of withstanding the fouling effects of the dirty flue gas, it is an ideal heat exchanger for transferring heat energy to the combustion air and in supplying the precipitator 34 with flue gas within acceptable temperature ranges.

Referring to the drawing, there is shown a vapor generator 10 having a furnace 11 containing a traveling grate 12 and a first flue gas temperature measuring probe 14 disposed above the grate 12 for monitoring the furnace gas temperature. Prepared fuel is injected into the furnace 11 by a spreader stoker 16 wherein the fuel is burned partially in suspension and partially on the grate 12.

Flue gases generated during the combustion process exit the vapor generator 10 via gas conduit 18 which houses an economizer 20. Damper 22 regulates the quantity of flue gas entering the economizer 20. From economizer 20, the flue gas is introduced into a tubular or first air heater 30 via gas conduit 28. Gas by-pass conduit 24 and damper 26 allow regulated quantities of flue gas to by-pass the economizer 20 and flow directly to the first air heater 30 via gas conduit 28. It should be noted that the vapor generator's total output of flue gas will always be channeled into the tubular air heater 30. Gas conduit 32 directs the flue gas from air heater 30 to an electrostatic precipitator 34 where it is cleaned and thereafter conveyed by gas conduit 36 into a regenerative or second air heater 40. A second flue gas temperature measuring probe 38, extending into the gas conduit 36, monitors the temperature of the flue gas being discharged from precipitator 34. An induced draft fan 44, connected to the regenerative air heater 40 via gas conduit 42 provides the suction required to urge the flow of flue gas through the aforementioned components.

A forced draft fan 46 delivers the required combustion air through an air conduit 48 into the regenerative air heater 40 where it is indirectly heated by the flue gas passing therethrough. A steam coil air heater 50 is disposed within the air conduit 48 to preheat the combustion air entering the regenerative air heater 40. This step aids in maintaining the cold end air heater temperature above the dew point of the flue gas thereby inhibiting corrosion within the regenerative air heater 40. The combustion air is then directed by air conduit 52 to the tubular air heater 30.

Damper 54, disposed within the air conduit 52, regulates the quantities of combustion air passing to the tubular air heater 30 from the regenerative air heater 40. Air conduit 56, conveys the combustion air from air heater 30 to furnace 11 underneath the grate 12. An air conduit 58 delivers overfire air which creates turbulence within the furnace 11 for better combustion and reduces carry-over of the fuel due to the introduction of the combustion air underneath the grate 12.

If the need arises to reduce the combustion air temperature, say, for example when low moisture refuse is used, damper means 62 will direct a regulated quantity of the required combustion air via by-pass conduit 60 to be reunited with the air leaving the first air heater 30 via air conduit 56 for final introduction into the furnace 11 underneath the grate 12.

Feedwater, being delivered to the vapor generator 10 through feed line 68, is preheated in the economizer 20. The water first enters the economizer 20 via feed line 66. A valve 70, disposed within the by-pass line 72, can selectively divert a portion of the feedwater around the economizer 20 for direct introduction to the vapor generator 10. As valve 70 is progressively opened, the temperature of the flue gas exiting the economizer 20 will correspondingly increase.

If feedwater is indeed diverted, vigilance must be exercised in monitoring the internal temperature of the economizer 20. If the internal temperature is allowed to rise above the critical level determined for its particular design, the economizer may be subjected to high temperature corrosion and/or water hammer.

The broken lines 100 and 102 indicate electrical control signals emanating from the first temperature probe 14 and the second temperature probe 38 respectively to the various dampers and valve 70. Their interrelated functions will be hereinafter explained.

The principles underlying the invention and the manner of applying it may perhaps be better understood by a consideration of the following examples.

Assume first that very low moisture content refuse is being fired in vapor generator 10. As was already discussed, low moisture fuel does not require high temperature combustion air. (It should be noted, however, that some preheated air can generally be used with this firing method and this is desirable from a boiler efficiency consideration). In such as case, due to reasons hereinafter discussed, damper 26 will generally remain closed whereas damper 22 will remain fully open so that all of the flue gas will exit through gas conduit 18 into the economizer 20. The valve 70 will remain closed so that all the boiler feedwater is directed through the economizer 20.

Now, assuming that the moisture content in the fuel has increased, the first temperature probe 14 will sense a drop in furnace gas temperature due to the aforementioned reasons. If the temperature falls below a predetermined value, the output control signal from temperature probe 14 will cause dampers 26 and 54 to either partially or fully open and cause dampers 22 and 62 to either partially or fully close. In addition, a portion of the furnace feedwater circulating through the economizer 20 may be rerouted by valve 70 to by-pass the economizer for direct introduction to the vapor generator 10. This step will aid in reducing the temperature drop experienced by the flue gas passing through the economizer 20. As a consequence, it should be now recognized that there will be an increase in the temperature of the flue gas entering the tubular air heater 30.

Simultaneously, in response to the temperature drop as detected by the first temperature probe 14, a proportion of the combustion air will be routed through the tubular air heater 30, for additional preheating. The degree of boost will be determined by the drop in gas temperature occurring in the furnace 11.

By the same token, the temperature of the flue gas passing through the regenerative air heater 40 after its indirect encounter with the combustion air may be reduced below the minimum necessary to prevent corrosion from occurring with the precipitator 34. The second temperature probe 38 will sense this decrease in temperature and provide an output control signal to further open damper 26 and/or valve 70 to compensate for this loss in temperature.

Of course, the degree of modulation exercised by the first temperature probe 14 and the dampers is directly related to the moisture content of the fuel. As the moisture level increases, the greater the need to partially or fully open by-pass dampers 26 and 54 and valve 70 and partially or fully close dampers 22 and 62 to raise the furnace temperature to its optimum design level. Conversely, as the moisture level decreases, the by-pass dampers 26 and 54 and valve 70 will then be ordered to partially or fully close and dampers 22 and 62 will be ordered to partially or fully open since the need for preheated combustion air is proportionally reduced.

While in accordance with the provisions of the statutes there is illustrated and described herein a specific embodiment of the invention, those skilled in the art will understand that changes may be made in the form of the invention covered by the claims and that certain features of the invention may sometimes be used to advantage without a corresponding use of the other features.

The embodiment of the invention in which an exclusive property or privilege is claimed are defined as follows:

1. In combination with a vapor generator having a furnace for burning fuels of varying moisture content, an apparatus for preheating air required for combustion and comprising conduit means defining an air and a flue gas flow path to and from the furnace, respectively, and economizer disposed in the gas flow path for preheating feedwater for the vapor generator, spaced first and second air heaters disposed downstream gas flow-wise of the economizer and communicating with the air and gas flow paths to heat the air through indirect heat exchange with the gas, the second air heater being disposed upstream air flow-wise and downstream gas flow-wise of the first air heater, means for regulating the air temperature including conduit means defining an air flow path by-passing the first air heater and a gas flow path by-passing the economizer, damper means for apportioning the flow of air between the first air heater and the by-pass air flow path and damper means for apportioning the flow of gas between the economizer and the by-pass gas flow path in response to changes in flue gas temperature resulting from changes in fuel moisture content.

2. The combination according to claim 1 wherein the air temperature regulating means includes a temperature sensing device extending into the furnace for detecting flue gas temperurture changes resulting from changes in fuel moisture content.

3. The combination according to claim 1 including an electrostatic precipitator communicating with the gas flow path intermediate said first and second air heaters.

4. The combination according to claim 3 wherein the apparatus includes conduit means defining a feedwater flow path by-passing the economizer and valve means for apportioning the flow of feedwater between the economizer and the by-pass feedwater flow path to maintain the precipitator outlet gas temperature above a predetermined value.

5. The combination according to claim 4 wherein a temperature sensing means disposed downstream gas flow-wise of the precipitator regulates both the quantity of the flue gas by-passing the economizer and the quantity of the boiler feedwater by-passing the economizer to maintain the temperature of the flue gas exiting the precipitator above a predetermined value.

6. The combination according to claim 1 including a steam coil air heater disposed in the air flow path upstream air flow-wise of said second air heater.

7. The combination according to claim 1 wherein the first air heater is a tubular air heater.

8. The combination according to claim 1 wherein the second air heater is a regenerative air heater.

9. A method for burning fuels of varying moisture content, and including a vapor generator furnace, an economizer for preheating feedwater for the vapor generator through indirect heat exhange with flue gas, spaced first and second air heaters for preheating combustion air in indirect heat exchange with flue gas, and conduit means for by-passing flue gas around the economizer and combustion air around the first air heater, which comprises the steps of:
   (a) detecting changes in flue gas temperature resulting from changes in fuel moisture content,
   (b) increasing the flue gas portion by-passing the economizer and decreasing the combustion air portion by-passing the first air heater in response to an increase in fuel moisture content, and
   (c) decreasing the flue gas portion by-passing the economizer and increasing the combustion air portion by-passing the first air heater in response to a decrease in fuel moisture content.

10. The method according to claim 9 and including an electrostatic precipitator disposed between the first and second air heaters for cleaning flue gas, conduit means for by-passing feedwater around the economizer, and comprising the steps of:
   (a) monitoring the precipitator gas outlet temperature, and
   (b) increasing the feedwater and flue gas portions by-passing the economizer to maintain the precipitator gas outlet temperature above a predetermined value.

* * * * *